United States Patent [19]

Gunn

[11] 4,022,262

[45] May 10, 1977

[54] SEALING LOCKNUT

[75] Inventor: Donald J. Gunn, Baldwinsville, N.Y.

[73] Assignee: Crouse-Hinds Company, Syracuse, N.Y.

[22] Filed: Apr. 9, 1976

[21] Appl. No.: 675,409

Related U.S. Application Data

[63] Continuation of Ser. No. 521,803, Nov. 7, 1974, abandoned.

[52] U.S. Cl. .................................. 151/7; 151/37
[51] Int. Cl.$^2$ .................. F16B 39/28; F16B 39/34
[58] Field of Search ............. 151/7, 37; 85/1 JP, 85/32 R; 285/161

[56] References Cited
UNITED STATES PATENTS 2,487,129  11/1949  Hallock ............................ 151/7
2,554,456  5/1951   Coleman et al. ................. 285/161
3,472,534  10/1969  Stevens ............................ 151/37

*Primary Examiner*—Ramon S. Britts
*Attorney, Agent, or Firm*—Sughrue, Rothwell, Mion, Zinn and Macpeak

[57] ABSTRACT

The sealing locknut is of the type commonly used for securing a conduit to an electrical junction box and is provided with a plurality of angular prongs or teeth about the circumference thereof adapted to bite into the metal of the junction box to obtain a good ground connection. An annular sealing ring of plastic or other suitable material is disposed on the side of the locknut on which the angular teeth project and the internal circumference of the gasket extends radially inwardly so as to resiliently engage the threads of a conduit upon which the locknut is threaded.

1 Claim, 6 Drawing Figures

SEALING LOCKNUT

This is a continuation of application Ser. No. 521,803, filed Nov. 7, 1974, now abandoned.

BACKGROUND OF THE INVENTION

The present invention is directed to a locknut of the type commonly used for connecting a conduit to an electrical junction box and more specifically to a locknut having a sealing ring of resilient material secured thereto to provide a sealed connection between the conduit, junction box and locknut.

Locknuts having a plurality of angular disposed teeth dispose about the circumference thereof are old and well known in the art. Such locknuts are commonly used to couple a conduit to an electrical junction box and the purpose of the angularly disposed teeth is to bite into the metal of the junction box wall when the locknut is tightened so as to scrape away any grease, paint or other foreign material which might be on the surface of the junction box wall to provide a good ground connection between the conduit and the junction box.

It is also old and well known in the art to provide a nut with a ring of sealing material on one face thereof to provide a tight connection with a wall or panel member as the nut is advanced on a threaded bolt or conduit. However, many such sealing rings protrude from the face of the nut a distance which will prevent actual contact of the nut with the wall or panel member against which the sealing ring is disposed. Such an arrangement would be completely unsatisfactory in the environment of an electrical junction box wherein most electrical codes throughout the country require that a good ground connection be formed between the wall of the junction box and the conduit through the locknut. Other sealing rings on locknuts are disposed in an annular groove in the face of the locknut spaced from the locknut threads. While such an arrangement will permit metal to metal contact between the locknut and the junction box the sealing ring will not engage the threads of the conduit nor will the sealing member extend into the gap between the threads of the conduit and the wall of the junction box to provide an air tight or water tight connection.

SUMMARY OF THE INVENTION

The present invention provides a sealing locknut which overcomes all of the aforementioned shortcomings of the known prior art to provide a perfect seal between the conduit and the junction box while still permitting a perfect ground connection between the wall of the junction box and the locknut threaded on the exterior surface of the conduit.

The present invention provides a sealing locknut wherein the ratio of the cross-sectional area of the sealing ring in its relaxed condition to the cross-sectional area defined by the opposing surfaces of the junction box and locknut and the external surface of the conduit is greater than unity so that sufficient sealing material will be available to completely fill the space between the locknut and the junction box wall as well as extend into the external threads of the conduit within the aperture in the junction box wall.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
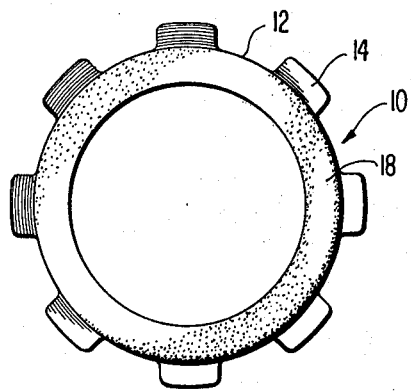
FIG. 1 is an end elevational view of the sealing locknut according to the present invention.
Figure 2:
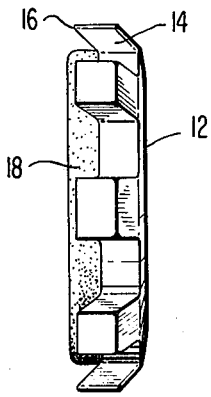
FIG. 2 is a side elevational view of the sealing locknut shown in FIG. 1.

The sealing locknut according to the present invention is generally shown at 10 in FIG. 1 and is comprised of an annular nut 12 having a central threaded aperture 13 and a plurality of outwardly and axially projecting angular teeth 14 disposed in spaced relation about the circumference thereof. The opposed surfaces of the locknut body are slightly conical with respect to the axis of the locknut and extend at an angle approximately 6° relative to a transverse plane perpendicular to the axis of the locknut. The teeth 14 extends at an angle approximately 45° relative to the axis of the locknut and are provided with a relatively sharp axially directed end surface 16 which is capable of cutting through paint, grease or other foreign matter on the surface of the metal junction box to provide a good ground connection between the nut and the junction box.

Figure 3A:
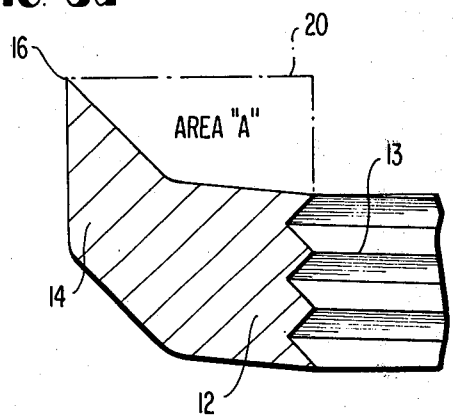
FIG. 3a is a partial enlarged sectional view of the locknut according to the present invention without the sealing ring and visually showing an area which must be completely filled by the sealing ring in its compressed condition.
Figure 3B:
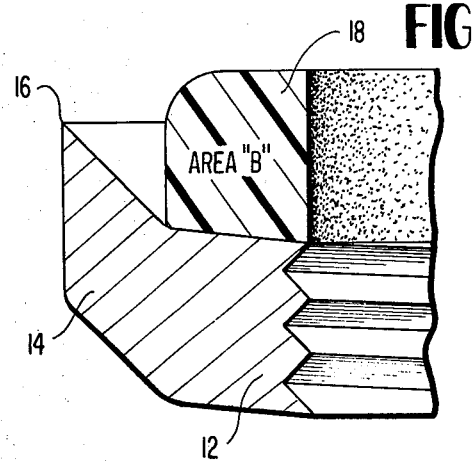
FIG. 3b is a partial enlarged sectional view of the locknut and sealing ring according to the present invention showing the cross-sectional area or configuration of the sealing ring prior to compression.
Figure 4:
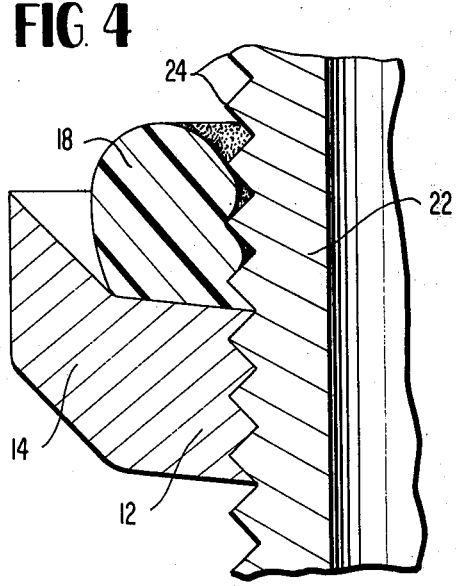
FIG. 4 is a partial enlarged sectional view of the sealing locknut according to the present invention as it is threaded on to a conduit prior to engagement with a junction box wall.
Figure 5:
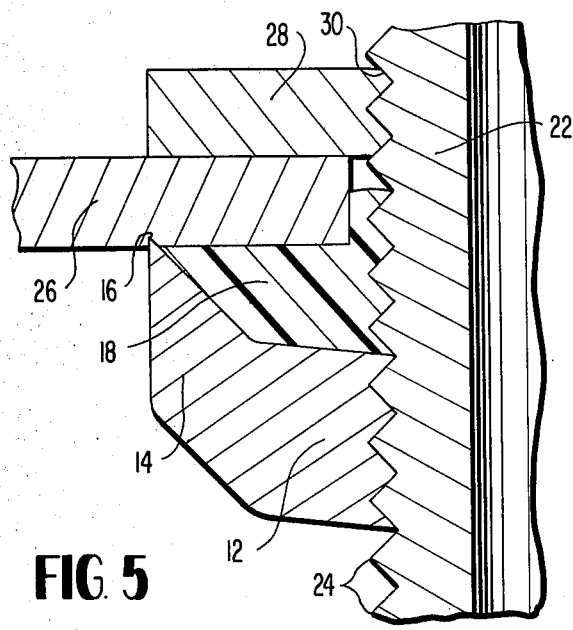
FIG. 5 is a partial enlarged sectional view of the sealing locknut according to the present invention disposed in final sealing engagement with a conduit and a junction box wall.

An annular sealing ring 18 of PVC or any other suitable resilient sealing material is secured to the face of the nut 12 from which the teeth 14 project. The sealing ring 18 is secured to the nut 12 by any suitable process. The ratio of the cross-sectional area B of the sealing ring as best shown in FIG. 3b to the area A as best shown in FIG. 3a should be greater than unity in order to provide sufficient sealing material to accomplish the sealing operation in the most efficient and complete manner. As an example, it was found that the area of B should be 125% of the area A. The inner circumference of the annular sealing ring 18 should extend radially inwardly into the vicinity of the threads on the nut 12 as best shown in FIG. 3b so that the sealing ring material will be positively engaged by and extend into the threads 24 on a conduit 22 upon which the nut 12 would be threaded. This engagement of the sealing ring by the threads 24 of the conduit 22 is best shown in FIGS. 4 and 5. FIG. 4 shows the sealing ring 18 as the nut 12 is being threaded on the conduit 22 and FIG. 5 shows the sealing ring 18 in its final compressed condition completely filling the area designated as A in FIG. 3a and additionally extending into the gap between the threads 24 on the conduit 22 and the inner circumference of an aperture in the wall 26 of a junction box or the like.

An additional nut 28 having internal threads 30 is threaded on the conduit 22 on the other side of the panel 26 so that the panel will be clamped between the two nuts 12 and 28. Instead of a nut 28 a flange integral with the conduit 22 could be provided or a sealing locknut similar to the sealing locknut 12 could be substituted for the nut 28.

While the invention has been particularly shown and described with reference to a preferred embodiment thereof, it will be understood by those in the art that various changes in form and details may be made therein without departing from the spirit and scope of the invention.

What is claimed is:

1. A sealing locknut for use with electrical conduits, boxes and the like to provide a fluid tight grounded connection comprising an annular nut having a central threaded aperture and a plurality of axially directed teeth disposed about the circumference of the nut in spaced relation to each other, said teeth being spaced apart by a distance at least equal to the circumferential width of a tooth and an annular resilient sealing ring means integrally secured to the side of the nut on which the teeth extend, said ring means having a smooth cylindrical inner surface and extending in the radial direction from the crest of the threads in the central aperture to the base of the teeth and in the axial direction from the side of the nut to a point beyond the axial extent of the teeth and wherein the ratio of the cross-sectional area of the sealing ring to the cross-sectional area encompassed by the side of the nut and an imaginary line representing an axial extension of the thread crest and an imaginary radial line extending inwardly from the axial directed ends of said teeth is greater than unity whereby said ring means will be substantially unconfined in the radially outward direction and will have sufficient material so that upon compression of the sealing ring as the integral nut and sealing ring are threaded on a conduit against a panel having an aperture through which the conduit extends the sealing ring will expand radially outwardly to but not over the ends of said teeth and axially into the aperture so that the sealing ring will not prevent the ends of said teeth from making a good electical connection between the conduit and panel.

* * * * *